United States Patent
Yoon et al.

(10) Patent No.: US 12,221,112 B2
(45) Date of Patent: Feb. 11, 2025

(54) APPARATUS FOR PREDICTING FRICTION COEFFICIENT OF ROAD SURFACE AND METHOD THEREOF

(71) Applicants: HYUNDAI MOTOR COMPANY, Seoul (KR); Kia Corporation, Seoul (KR); Inha University Research and Business Foundation, Incheon (KR)

(72) Inventors: Young Sam Yoon, Hwaseong-si (KR); Jae Hun Lee, Yongin-si (KR); Ki Ho Yum, Seoul (KR); Dong Jin Jang, Siheung-si (KR); Sung Wook Hwang, Seoul (KR); Sang Kwon Lee, Seoul (KR)

(73) Assignees: HYUNDAI MOTOR COMPANY, Seoul (KR); KIA CORPORATION, Seoul (KR); INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 287 days.

(21) Appl. No.: 17/961,826

(22) Filed: Oct. 7, 2022

(65) Prior Publication Data
US 2023/0331236 A1 Oct. 19, 2023

(51) Int. Cl.
*B60W 40/068* (2012.01)
(52) U.S. Cl.
CPC ....... *B60W 40/068* (2013.01); *B60W 2420/54* (2013.01); *B60W 2422/70* (2013.01)
(58) Field of Classification Search
CPC ........... B60W 40/068; B60W 2420/54; B60W 2422/70
See application file for complete search history.

(56) References Cited

U.S. PATENT DOCUMENTS

| 5,586,028 A * | 12/1996 | Sekine | B60T 8/174 701/1 |
| 6,954,146 B2 | 10/2005 | Bhagavathula et al. | |
| 10,365,248 B2 | 7/2019 | Paturie et al. | |
| 2004/0212516 A1 | 10/2004 | Bhagavathula et al. | |
| 2021/0188284 A1* | 6/2021 | Hassel | B60W 10/20 |

(Continued)

FOREIGN PATENT DOCUMENTS

| CN | 110569739 A | 12/2019 |
| JP | H08-298613 A | 11/1996 |
| JP | 2004-198433 A | 7/2004 |

(Continued)

*Primary Examiner* — Dale Moyer
(74) *Attorney, Agent, or Firm* — MORGAN, LEWIS & BOCKIUS LLP

(57) ABSTRACT

An apparatus and method for predicting a friction coefficient of a road surface are disclosed. The apparatus includes a microphone that obtains a sound signal around a tire mounted on a vehicle, and a controller that estimates a state and a type of the road surface and a degree of tire wear corresponding to the sound signal around the tire based on a first deep learning model, estimates a peak adjustment factor and an initial inclination adjustment factor of a friction coefficient curve corresponding to the state and the type of the road surface and the degree of tire wear based on a second deep learning model, and predicts the friction coefficient based on the peak adjustment factor and the initial inclination adjustment factor of the friction coefficient curve.

20 Claims, 17 Drawing Sheets

(56) References Cited

U.S. PATENT DOCUMENTS

2022/0009501 A1 1/2022 Guan et al.
2022/0219704 A1* 7/2022 Wang ....................... H04S 7/40

FOREIGN PATENT DOCUMENTS

| JP | 2010-188885 A | 9/2010 | | |
|---|---|---|---|---|
| KR | 10-2019-0043848 A | 4/2019 | | |
| KR | 10-2022-0013579 A | 2/2022 | | |
| KR | 20220134940 A | * | 10/2022 | .......... B60W 40/068 |

* cited by examiner

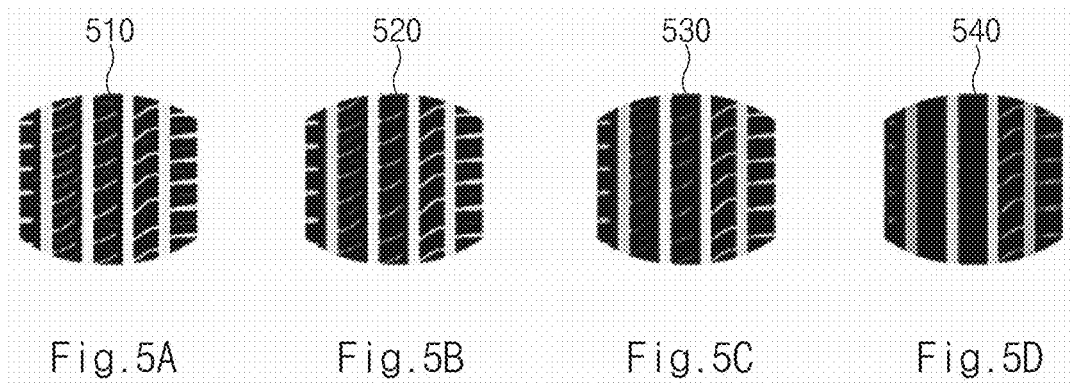

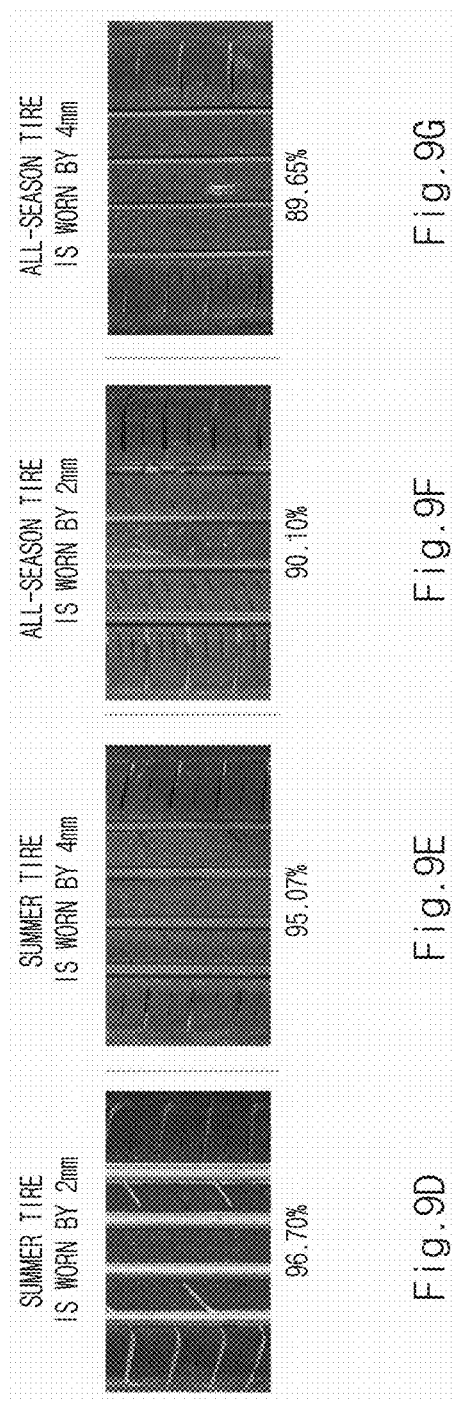

APPARATUS FOR PREDICTING FRICTION COEFFICIENT OF ROAD SURFACE AND METHOD THEREOF

CROSS-REFERENCE TO RELATED APPLICATION

This application claims the benefit of priority to Korean Patent Application No. 10-2022-0045851, filed in the Korean Intellectual Property Office on Apr. 13, 2022, the entire contents of which are incorporated herein by reference.

TECHNICAL FIELD

The present disclosure relates to a technology for predicting a friction coefficient (e.g., µ-Peak) of a road surface based on a sound signal around a tire.

BACKGROUND

In general, deep learning (or a deep neural network), which is a type of machine learning, may include a multi-layered artificial neural network (ANN) between an input and an output. Such an artificial neural network may include a convolutional neural network (CNN) or a recurrent neural network (RNN), and the like according to a structure, a problem to be solved, and a purpose.

Data input to the convolutional neural network is divided into a training set and a test set. The convolutional neural network learns the weights of the neural network through the training set, and checks the learned result through the test set.

That is, when data is input to the convolutional neural network, the operation is carried out step by step from the input layer to the hidden layer and the result is output. In this process, the input data passes through all nodes only once. In this case, the fact that input data passes through all nodes only once means a structure that does not consider the order of data, that is, the temporal aspect.

After all, the convolutional neural network performs learning regardless of the temporal order of the input data. Meanwhile, because the recurrent neural network has a structure in which the result of the hidden layer is input to the hidden layer again, such a structure means that the temporal order of the input data is considered.

Meanwhile, as a conventional technique for predicting the state of a road surface, there has been proposed a technology for measuring a sound signal around a tire and detecting the state of the road surface based on the power spectrum density of the sound signal corresponding to a specified frequency range. However, such a conventional technique has poor prediction accuracy.

The matters described in this background section are intended to promote an understanding of the background of the disclosure and may include matters that are not already known to those of ordinary skill in the art.

SUMMARY

The present disclosure has been made to solve the above-mentioned problems occurring in the related art while advantages achieved by the related art are maintained intact.

An aspect of the present disclosure provides an apparatus and method for predicting a friction coefficient of a road surface capable of improving prediction accuracy by estimating state and a type of the road surface and a degree of tire wear corresponding to a sound signal around a tire based on a first deep learning model, estimating a peak adjustment factor and an initial inclination adjustment factor of a friction coefficient curve corresponding to the state and the type of the road surface and the degree of tire wear based on a second deep learning model, and predicting the friction coefficient based on the peak adjustment factor and the initial inclination adjustment factor of the friction coefficient curve.

The technical objects of the present disclosure are not limited to the above-mentioned one, and the other unmentioned technical objects and advantages will become apparent from the following description. Also, it may be easily understood that the objects and advantages of the present disclosure may be realized by the units and combinations thereof recited in the claims.

According to an aspect of the present disclosure, an apparatus for predicting a friction coefficient of a road surface may include a microphone that obtains a sound signal around a tire mounted on a vehicle, and a controller that estimates a state and a type of the road surface and a degree of tire wear corresponding to the sound signal around the tire based on a first deep learning model, estimates a peak adjustment factor and an initial inclination adjustment factor of a friction coefficient curve corresponding to the state and the type of the road surface and the degree of tire wear based on a second deep learning model, and predicts the friction coefficient based on the peak adjustment factor and the initial inclination adjustment factor of the friction coefficient curve.

According to an embodiment, the controller may convert the sound signal around the tire into an image, and input the image into the first deep learning model to estimate the state and the type of the road surface and the degree of tire wear.

According to an embodiment, the controller may divide the sound signal around the tire obtained through the microphone by a unit of a preset time, convert the divided sound signal into a first image, and normalize a region of interest in the first image to a second image of a preset size.

According to an embodiment, the controller may convert the divided sound signal to the first image based on a continuous wavelet transform (CWT) algorithm.

According to an embodiment, the controller may generate a surface image of the tire corresponding to the degree of tire wear.

According to an embodiment, the controller may estimate the peak adjustment factor and the initial inclination adjustment factor of the friction coefficient curve corresponding to the state and the type of the road surface and the surface image of the tire based on the second deep learning model.

According to an embodiment, the controller may generate the friction coefficient curve based on the peak adjustment factor and the initial inclination adjustment factor of the friction coefficient curve, and predict a maximum friction coefficient on the friction coefficient curve.

According to an embodiment, the state of the road surface may include at least one of a dry state, a wet state, a snow state, and an ice state.

According to an embodiment, the type of the road surface may include at least one of a new asphalt, an old asphalt, a first concrete, a second concrete, a lateral groove, and a longitudinal groove.

According to an embodiment, the microphone may be mounted in front of a wheel housing arranged on a rear wheel of the vehicle.

According to an aspect of the present disclosure, a method of predicting a friction coefficient of a road surface may include acquiring, by a microphone, a sound signal around a tire mounted on a vehicle, estimating, by a controller, a state and a type of the road surface and a degree of tire wear corresponding to the sound signal around the tire based on a first deep learning model, estimating, by the controller, a peak adjustment factor and an initial inclination adjustment factor of a friction coefficient curve corresponding to the state and the type of the road surface and the degree of tire wear based on a second deep learning model, and predicting, by the controller, the friction coefficient based on the peak adjustment factor and the initial inclination adjustment factor of the friction coefficient curve.

According to an embodiment, the estimating of the state and the type of the road surface and the degree of the tire wear may include converting, by the controller, the sound signal around the tire into an image, and inputting, by the controller, the image into the first deep learning model to estimate the state and the type of the road surface and the degree of tire wear.

According to an embodiment, the converting of the sound signal around the tire to the image may include dividing, by the controller, the sound signal around the tire obtained through the microphone by a unit of a preset time, converting, by the controller, the divided sound signal into a first image, and normalizing a region of interest in the first image to a second image of a preset size.

According to an embodiment, the converting of the divided sound signal into the image may include converting, by the controller, the divided sound signal to the first image based on a continuous wavelet transform (CWT) algorithm.

According to an embodiment, the estimating of the peak adjustment factor and the initial inclination adjustment factor may include generating, by the controller, a surface image of the tire corresponding to the degree of tire wear.

According to an embodiment, the predicting of the friction coefficient may include estimating, by the controller, the peak adjustment factor and the initial inclination adjustment factor of the friction coefficient curve corresponding to the state and the type of the road surface and the surface image of the tire based on the second deep learning model.

According to an embodiment, the predicting of the friction coefficient may include generating, by the controller, the friction coefficient curve based on the peak adjustment factor and the initial inclination adjustment factor of the friction coefficient curve, and predicting, by the controller, a maximum friction coefficient on the friction coefficient curve.

BRIEF DESCRIPTION OF THE DRAWINGS

The above and other objects, features and advantages of the present disclosure will be more apparent from the following detailed description taken in conjunction with the accompanying drawings:

FIGS. 5A to 5D are views illustrating a tire surface image corresponding to a degree of tire wear generated by a controller provided in an apparatus for predicting a friction coefficient of a road surface according to an embodiment of the present disclosure;

FIGS. 9D to 9G are fourth exemplary views illustrating the effect of temperature on the estimation performance of a first deep learning model provided in an apparatus for predicting a friction coefficient of a road surface according to an embodiment of the present disclosure;

DETAILED DESCRIPTION

Figure 1:
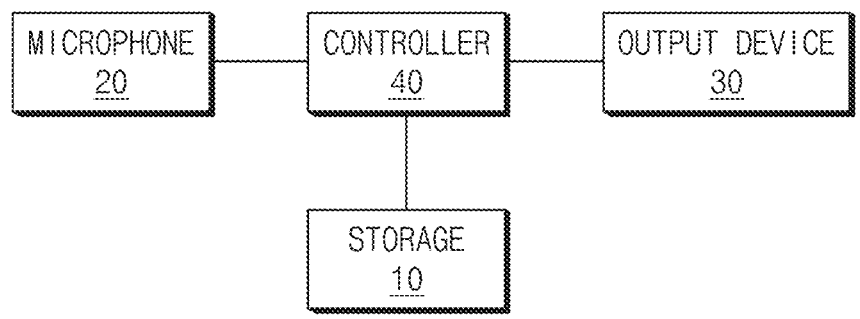
FIG. 1 is a block diagram of an apparatus for predicting a friction coefficient of a road surface according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an apparatus for predicting a friction coefficient of a road surface according to an embodiment of the present disclosure.

As shown in FIG. 1, an apparatus for predicting a friction coefficient of a road surface according to an embodiment of the present disclosure may include storage 10, a microphone 20, an output device 30, and a controller 40. In this case, depending on a scheme of implementing an apparatus for predicting a friction coefficient of a road surface according to an embodiment of the present disclosure, components may be combined with each other to be implemented as one, or some components may be omitted.

Regarding each component, the storage 10 may store various logic, algorithms and programs required in the processes of estimating state and a type of the road surface and a degree of tire wear (degree at which a tire is worn) corresponding to a sound signal around a tire based on a first deep learning model, estimating a peak adjustment factor and an initial inclination adjustment factor of a friction coefficient curve corresponding to the state and the type of the road surface and the degree of tire wear based on a second deep learning model, and predicting the friction coefficient based on the peak adjustment factor and the initial inclination adjustment factor of the friction coefficient curve.

The storage 10 may store the first deep learning model based on a convolution neural network (CNN) in which learning is completed, and may store a continuous wavelet transform (CWT) algorithm that is required in the process of training the CNN-based first deep learning model or using the CNN-based first deep learning model in which the learning is completed. The CWT algorithm may be used to convert a sound signal around a tire into an image.

For reference, the Fourier transform, which is a mathematical technique for decomposing a function or signal of time into frequency components, can express any type of signal through the sum of sine curves having various frequencies and amplitudes. Although it is possible to be able to analyze frequencies present in a signal through the Fourier transform, there is a limitation in that it is impossible to know when each frequency exists in time because information about time disappears. Therefore, it is difficult to properly analyze a signal whose frequency varies with time. Because it is as if the notes are arranged according to the pitch (frequency) of the notes, not according to the passage of time, although it is possible to know which notes are included in a song, it is impossible to know what kind of music these notes actually make up. To the contrary, the CWT increases the temporal resolution and lowers the frequency resolution for a high-frequency component signal, while increasing the frequency resolution and lowering the temporal resolution for a low-frequency component signal. Unlike the Fourier transform using a temporally infinite sinusoid as a basic function, the CWT uses a temporally limited wavelet function as a basic function. The core of CWT is to analyze a signal by scaling (expanding or reducing with respect to time) and shifting (moving on the time axis) wavelets.

The storage 10 may store the second deep learning model based on a convolution neural network (CNN) that has been trained, and may also store an algorithm used to generate a tire surface shape (image) corresponding to a degree of tire wear estimated through the CNN-based first deep learning model. In this case, the second deep learning model may estimate a peak adjustment factor and an initial inclination adjustment factor of a friction coefficient curve based on the state and type of a road surface and a tire surface shape estimated through the first deep learning model. The horizontal axis of the friction coefficient curve may represent a slip rate (%) and the vertical axis may represent a diagram representing the friction coefficient, which is generated based on a generally well-known magic formula. The magic formula may be expressed as following Equation 1.

$$y = D \times \sin\{C \times \arctan[Bx - E \times (Bx - \arctan(Bx))]\} \quad \text{[Equation 1]}$$

Where 'B' represents a stiffness adjustment factor determining the inclination at the origin, 'C' represents a shape adjustment factor determining the overall shape of a sine function, 'D' is a peak adjustment factor determining the highest point of a friction coefficient curve, and the product (BCD) of B, C and D represents an initial inclination adjustment factor of the friction coefficient curve.

The storage 10 may store an algorithm for predicting the maximum friction coefficient ($\mu$-peak) based on the peak adjustment factor and the initial inclination adjustment factor of the friction coefficient curve. For reference, when the braking force is sufficiently greater than the road friction force of the tire and the slip ratio exceeds '1', the vehicle moves but the wheels are stopped. In such a state which is expressed as wheel locking and is the most dangerous state in braking, it is impossible to steer the vehicle and it is impossible to predict where the vehicle will go. The maximum friction coefficient, which is an important characteristic value that determines a braking distance of a tire mounted on a vehicle, represents a friction coefficient immediately before the wheel is locked.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The microphone 20 may be implemented as, for example, a rugged pressure microphone, and may be mounted in front of a wheel housing arranged on a rear wheel of a vehicle to measure a sound signal generated by a tire. The microphone 20 may obtain a sound signal with a sampling frequency of, for example, 12,800 Hz.

The output device 30 may display the friction coefficient curve generated by the controller 40. In this case, the maximum friction coefficient on the friction coefficient curve may be displayed. The output device 30, which is a communication module for transmitting the maximum friction coefficient to an external server, may include at least one of a mobile communication module, a wireless Internet module, and a short-range communication module.

The mobile communication module may communicate with the external server or another vehicle through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), 4th generation mobile telecommunication (4G), 5th Generation mobile telecommunication (5G), and the like).

The wireless Internet module, which is a module for wireless Internet access, may communicate with the external server or another vehicle through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The short-range communication module may support short-range communication by using at least one of Bluetooth™, radio frequency identification (RFID), infrared data association (IrDA), ultra wideband (UWB), ZigBee, near field communication (NFC), and wireless universal serial bus (USB) technology.

The controller 40 may perform overall control such that each component performs its function. The controller 40 may be implemented in the form of hardware or software, or may be implemented in a combination of hardware and software. Preferably, the controller 40 may be implemented as a microprocessor, but is not limited thereto.

Specifically, the controller 40 may perform various controls required in the processes of estimating the state and type of a road surface corresponding to a sound signal around a tire and a degree of tire wear based on a first deep learning model, estimating a peak adjustment factor and an initial inclination adjustment factor of a friction coefficient curve corresponding to the state and the type of the road surface and the degree of tire wear based on a second deep learning model, and predicting the friction coefficient based on the peak adjustment factor and the initial inclination adjustment factor of the friction coefficient curve.

The controller 40 may generate a friction coefficient curve based on the peak adjustment factor and the initial inclination adjustment factor of the friction coefficient curve, and detect the maximum friction coefficient on the friction coefficient curve.

In the process of learning the first deep learning model or using the first deep learning model that has been trained, the controller 40 may convert the sound signal around the tire into an image based on a continuous wavelet transform (CWT) algorithm, and normalize (rescale) the image.

The controller 40 may generate a surface shape (image) of the tire corresponding to the degree of tire wear estimated through the first deep learning model.

The controller 40 may input the state and type of the road surface estimated through the first deep learning model and the surface shape of the tire to the second deep learning model to estimate the peak adjustment factor and the initial inclination adjustment factor of the friction coefficient curve, and may generate a friction coefficient curve corresponding to the peak adjustment factor and the initial inclination adjustment factor of the friction coefficient curve based on the magic formula. In this case, the friction coefficient curve is a predicted curve.

The controller 40 may detect the maximum friction coefficient on the friction coefficient curve.

The controller 40 may control the microphone 20 to measure the sound signal generated by the tire.

The controller 40 may control the output device 30 to display or transmit the friction coefficient curve to an external server.

The controller 40 may control the output device 30 to display the maximum friction coefficient on the friction coefficient curve or transmit the maximum friction coefficient on the friction coefficient curve to an external server.

Hereinafter, the operation of the controller 40 will be described in detail with reference to FIGS. 2 to 7.

Figure 2:
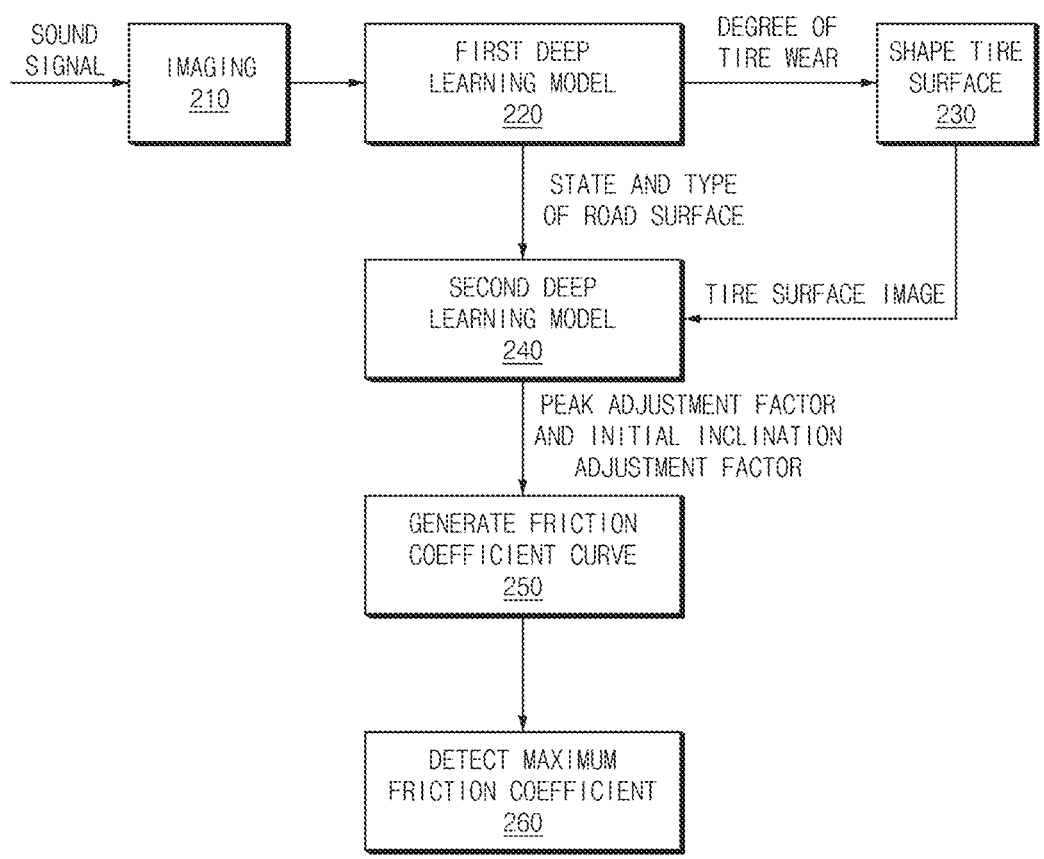
FIG. 2 is a block diagram illustrating a process in which a controller provided in an apparatus for predicting a friction coefficient of a road surface according to an embodiment of the present disclosure detects the maximum friction coefficient of the road surface.
Figure 3:
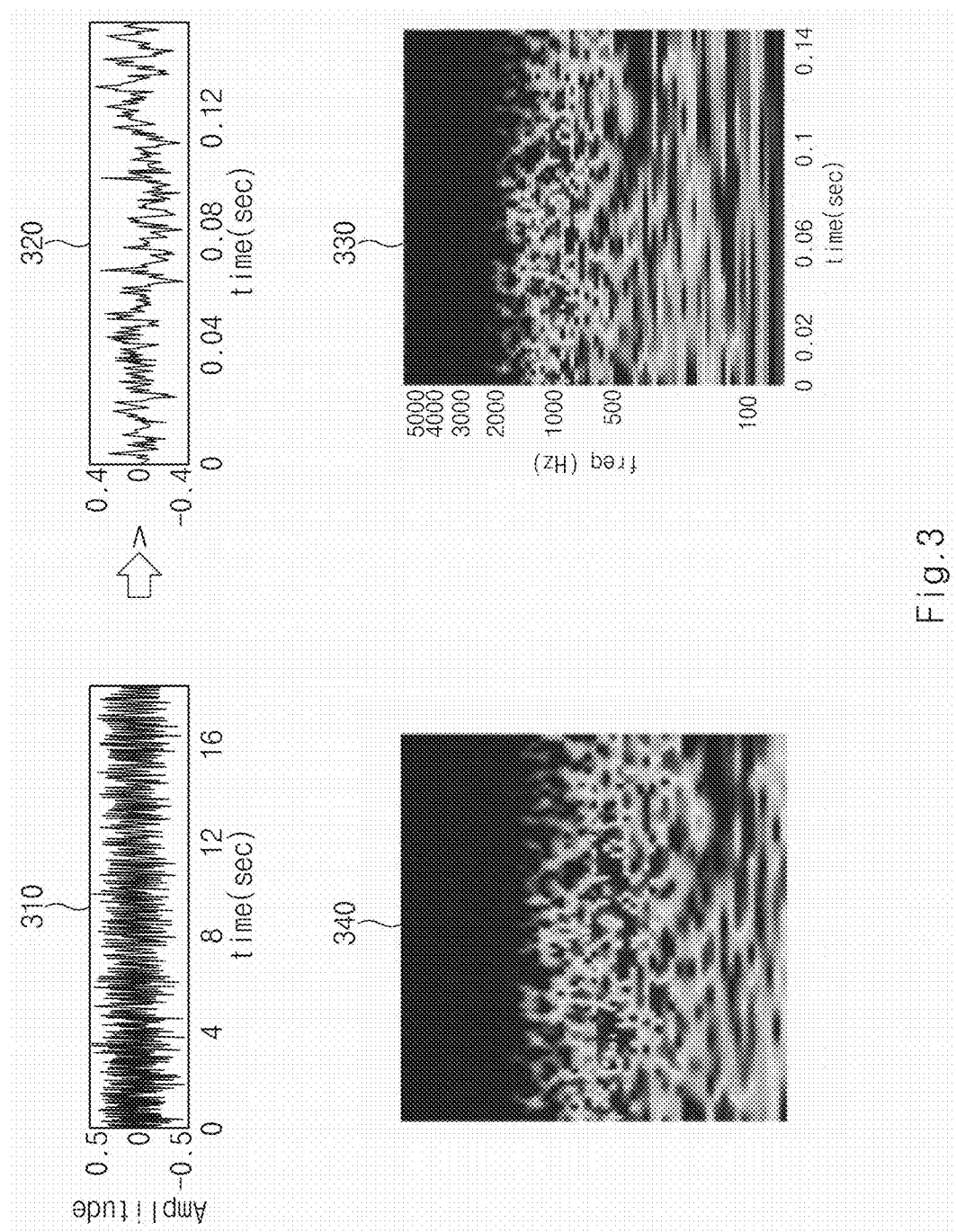
FIG. 3 is a view illustrating a process in which a controller provided in an apparatus for predicting a friction coefficient of a road surface according to an embodiment of the present disclosure images a sound signal.
Figure 4:
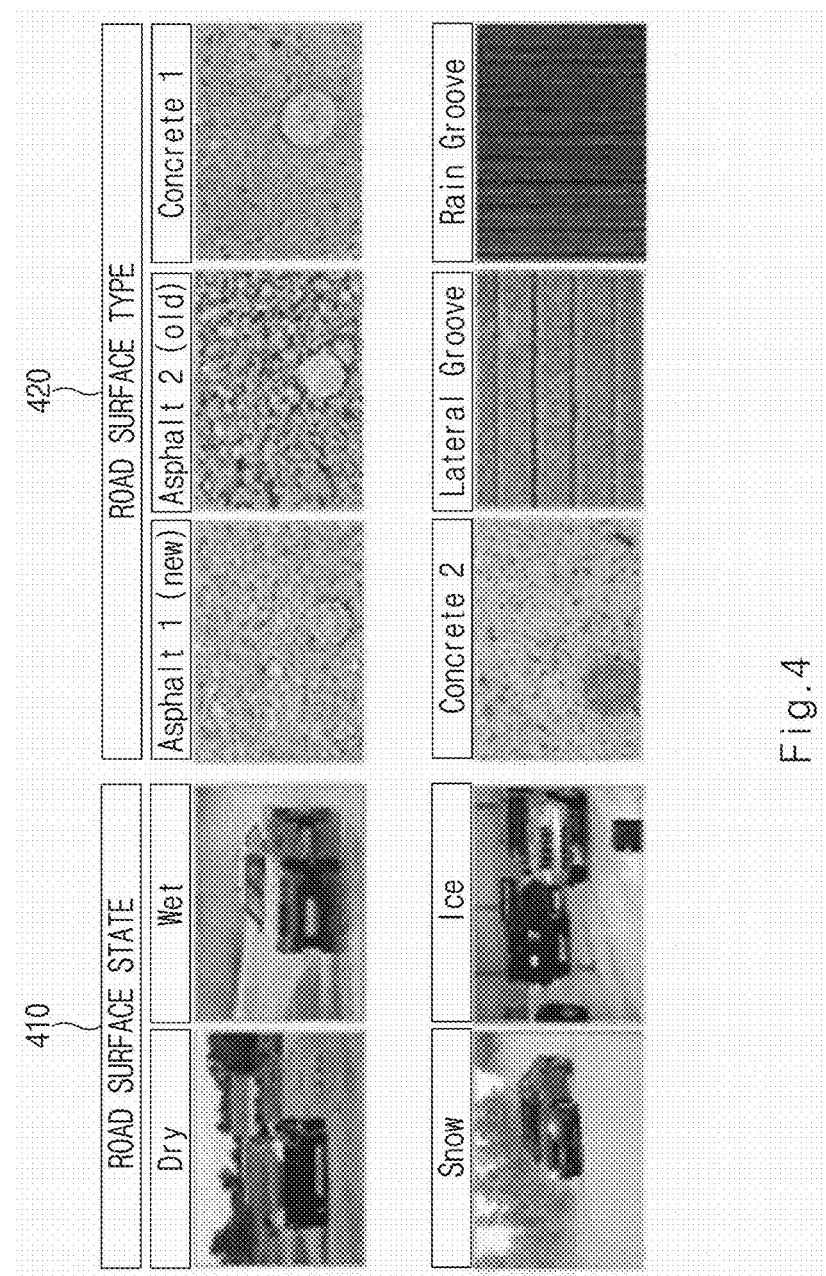
FIG. 4 is a view illustrating the state and type of a road surface estimated based on the first deep learning model by a controller provided in an apparatus for predicting a friction coefficient of the road surface according to an embodiment of the present disclosure.

FIG. 2 is a block diagram illustrating a process in which a controller provided in an apparatus for predicting a friction coefficient of a road surface according to an embodiment of the present disclosure detects the maximum friction coefficient of the road surface. FIG. 3 is a view illustrating a process in which a controller provided in an apparatus for predicting a friction coefficient of a road surface according to an embodiment of the present disclosure images a sound signal. FIG. 4 is a view illustrating the state and type of a road surface estimated based on the first deep learning model by a controller provided in an apparatus for predicting a friction coefficient of the road surface according to an embodiment of the present disclosure. FIGS. 5A to 5D are views illustrating a tire surface image corresponding to a degree of tire wear generated by a controller provided in an apparatus for predicting a friction coefficient of a road surface according to an embodiment of the present disclosure.

As shown in FIG. 2, first, the controller 40 may image a sound signal obtained through the microphone 20 in 210. In this case, the controller 40 may perform a pre-processing operation as shown in FIG. 3. That is, the controller 40 may divide a sound signal 310 obtained through the microphone 20 in units (or by a unit) of a preset time (e.g., 0.15 seconds). Then, the controller may image the divided sound signal 320 based on the CWT algorithm. That is, the controller 40 may generate a three-dimensional image 330 corresponding to the divided sound signal 320. Then, the controller 40 may normalize (rescale) the image 330. That is, the controller 40 may cut out a region corresponding to a preset frequency section (e.g., 0 Hz to 200 Hz) from the image 330 and normalize the remaining region (region of interest) to an image of a preset size (e.g., 224×224×3).

Thereafter, in 220, the controller 40 may estimate the state and type of the road surface and the degree of tire wear corresponding to the normalized image based on the first deep learning model. In this case, as shown in FIG. 4, a road surface state 410 may include a dry state, a wet state, a snow state, and a frozen state (ice). A road surface type 420 may include new asphalt (asphalt 1), old asphalt (asphalt 2), a first concrete (concrete 1), a second concrete (concrete 2), a lateral groove, a longitudinal groove (e.g., a rain groove), and the like.

Thereafter, the controller 40 may shape the surface of the tire based on the degree of tire wear in 230. That is, the controller 40 may generate a tire surface image corresponding to the degree of tire wear. For example, as shown in FIG. 5A, reference numeral '510' denotes a first tire surface image corresponding to a first degree (e.g., 0 mm) of tire wear, as shown in FIG. 5B, reference numeral '520' denotes a second tire surface image corresponding to a second degree (e.g., 2 mm) of tire wear, as shown in FIG. 5C, reference numeral '530' denotes a third tire surface image corresponding to a third degree (e.g., 4 mm) of tire wear, and as shown in FIG. 5D, reference numeral '540' denotes a fourth tire surface image corresponding to a fourth degree (e.g., 6 mm) of tire wear.

Thereafter, in 240, the controller 40 may estimate the peak adjustment factor and the initial inclination adjustment factor of the friction coefficient curve corresponding to the state and type of the road surface and the tire surface image based on the second deep learning model. In this case, the second deep learning model may output the peak adjustment factor having a high value for a dry road surface and output the peak adjustment factor having a low value for a wet road surface. In addition, the second deep learning model may output the initial inclination adjustment factor having a high value when the block stiffness decreases as the degree of tire wear increases. In this case, the effect of the peak adjustment factor on the friction coefficient curve is as shown in FIG. 6A, and the effect of the initial inclination adjustment factor on the friction coefficient curve is shown in FIG. 6B.

Figure 6A:
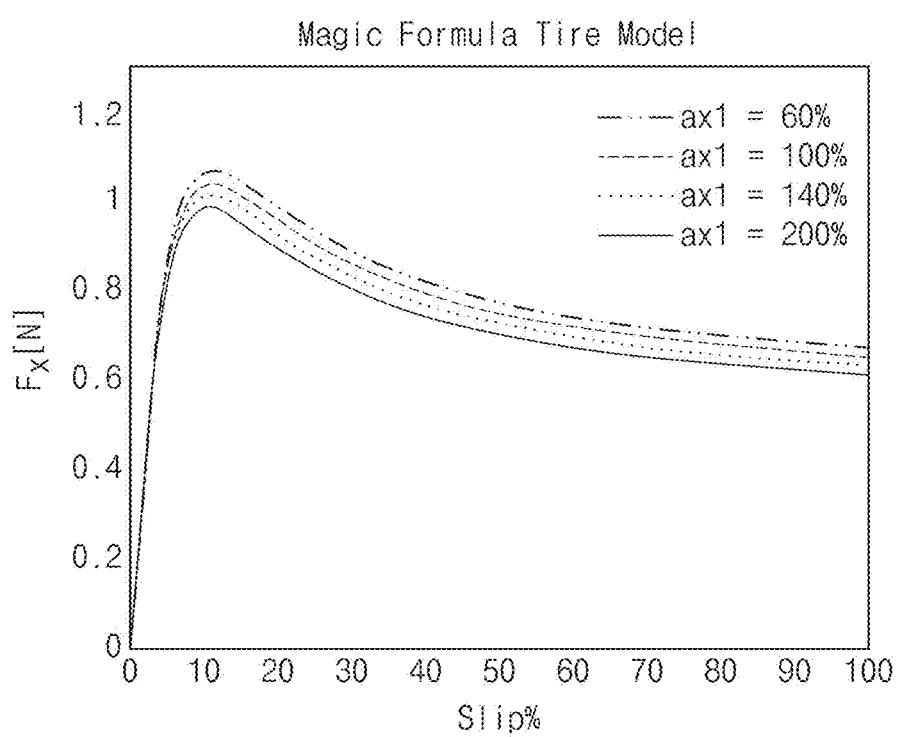
FIG. 6A is a view illustrating the relationship between a peak adjustment factor (ax1) and a friction coefficient curve used by a controller provided in an apparatus for predicting a friction coefficient of a road surface according to an embodiment of the present disclosure.

FIG. 6A is a view illustrating the relationship between a peak adjustment factor (ax1) and a friction coefficient curve used by a controller provided in an apparatus for predicting a friction coefficient of a road surface according to an embodiment of the present disclosure.

As shown in FIG. 6A, it may be understood that the higher the ratio (%) of the peak adjustment factor (ax1), the lower the peak value (maximum friction coefficient) of the friction coefficient curve. Therefore, the maximum friction coefficient becomes higher in the order of the friction coefficient curve having the peak adjustment factor (ax1) ratio of 60%, the friction coefficient curve having the peak adjustment factor (ax1) ratio of 100%, the friction coefficient curve having the peak adjustment factor (ax1) ratio of 140%, and the friction coefficient curve having the peak adjustment factor (ax1) ratio of 200%.

Figure 6B:
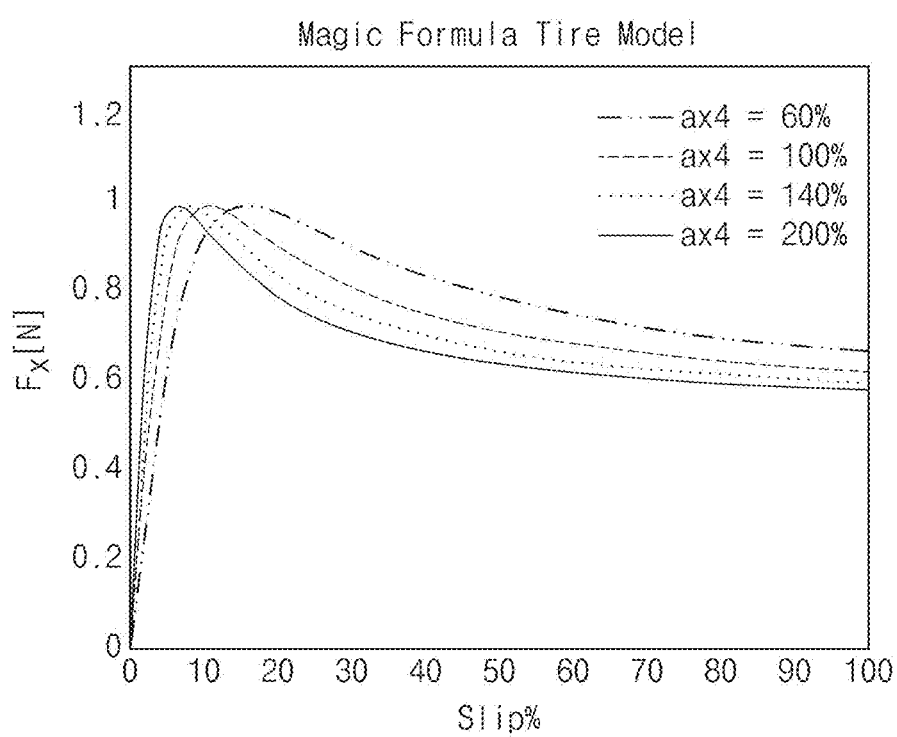
FIG. 6B is a view illustrating the relationship between the initial inclination adjustment factor (ax4) and the friction coefficient curve used by a controller provided in an apparatus for predicting a friction coefficient of a road surface according to an embodiment of the present disclosure.

FIG. 6B is a view illustrating the relationship between the initial inclination adjustment factor (ax4) and the friction coefficient curve used by a controller provided in an apparatus for predicting a friction coefficient of a road surface according to an embodiment of the present disclosure.

As shown in FIG. 6B, it may be understood that the higher the ratio (%) of the initial inclination adjustment factor (ax4), the larger the initial inclination of the friction coefficient curve. Therefore, the initial inclination becomes higher in the order of the friction coefficient curve having the initial inclination adjustment factor of 200%, the friction coefficient curve having the initial inclination adjustment factor of 140%, the friction coefficient curve having the initial inclination adjustment factor of 100%, and the friction coefficient curve having the initial inclination adjustment factor of 60%.

Thereafter, in 250, the controller 40 may generate the friction coefficient curve based on the peak adjustment factor and the initial inclination adjustment factor of the friction coefficient curve. The friction coefficient curve thus generated is shown in FIG. 7 as an example.

Figure 7:
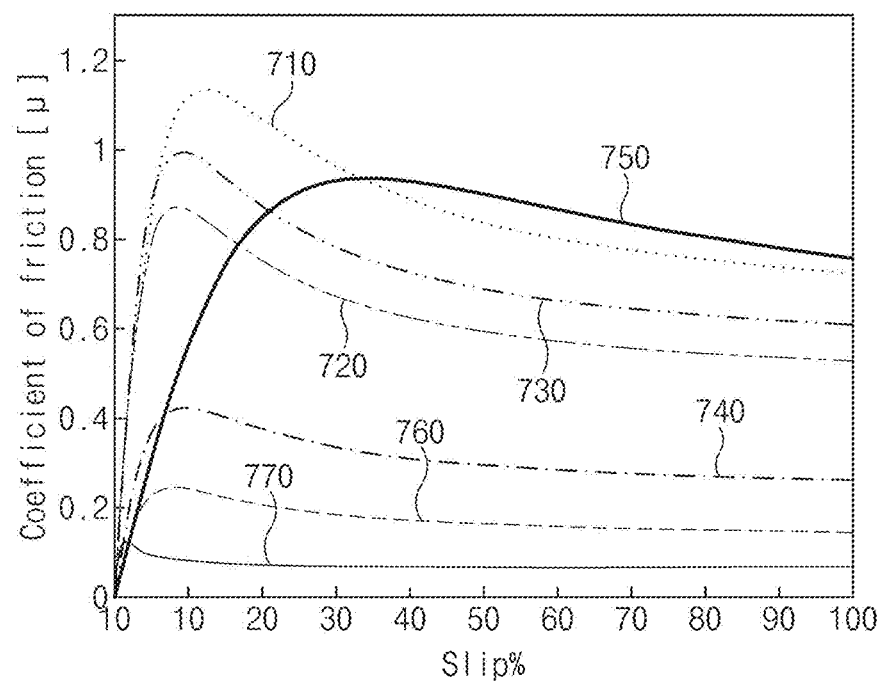
FIG. 7 is a view illustrating a friction coefficient curve generated by a controller provided in an apparatus for predicting a friction coefficient of a road surface according to an embodiment of the present disclosure.

FIG. 7 is a view illustrating a friction coefficient curve generated by a controller provided in an apparatus for predicting a friction coefficient of a road surface according to an embodiment of the present disclosure.

As shown in FIG. 7, the horizontal axis represents the slip ratio (%), and the vertical axis represents the friction coefficient. In addition, reference numeral '710' denotes the friction coefficient curve in a dry state, reference numeral '720' denotes the friction coefficient curve in a wet state, reference numeral '730' denotes the friction coefficient curve in a dry concrete, reference numeral '740' denotes the friction coefficient curve on a wet gravel road, reference numeral '750' denotes the friction coefficient curve on a dry gravel road, reference numeral '760' denotes the friction coefficient curve on a snowy road, and reference numeral '770' denotes the friction coefficient curve on an icy road.

Thereafter, in 260, the controller 40 may detect the maximum friction coefficient from each of the friction coefficient curves 710 to 770. In this case, because each friction coefficient curve is predicted based on the peak adjustment factor and the initial inclination adjustment factor of the friction coefficient curve, the detection of the maximum friction coefficient in each friction coefficient curve means the prediction of the maximum friction coefficient in each friction coefficient curve.

Hereinafter, the performance verification result of the first deep learning model will be described with reference to FIGS. 8A and 8B.

First, as the road surface conditions used to verify the performance of the first deep learning model, snow ①, dry asphalt ②, wet new asphalt ③, dry new concrete ④, dry old concrete ⑤, wet new concrete ⑥, and dry concrete lateral groove ⑦ were set. Estimation results of the first deep learning model under the road surface conditions are shown in FIGS. 8A and 8B.

Figure 8A:
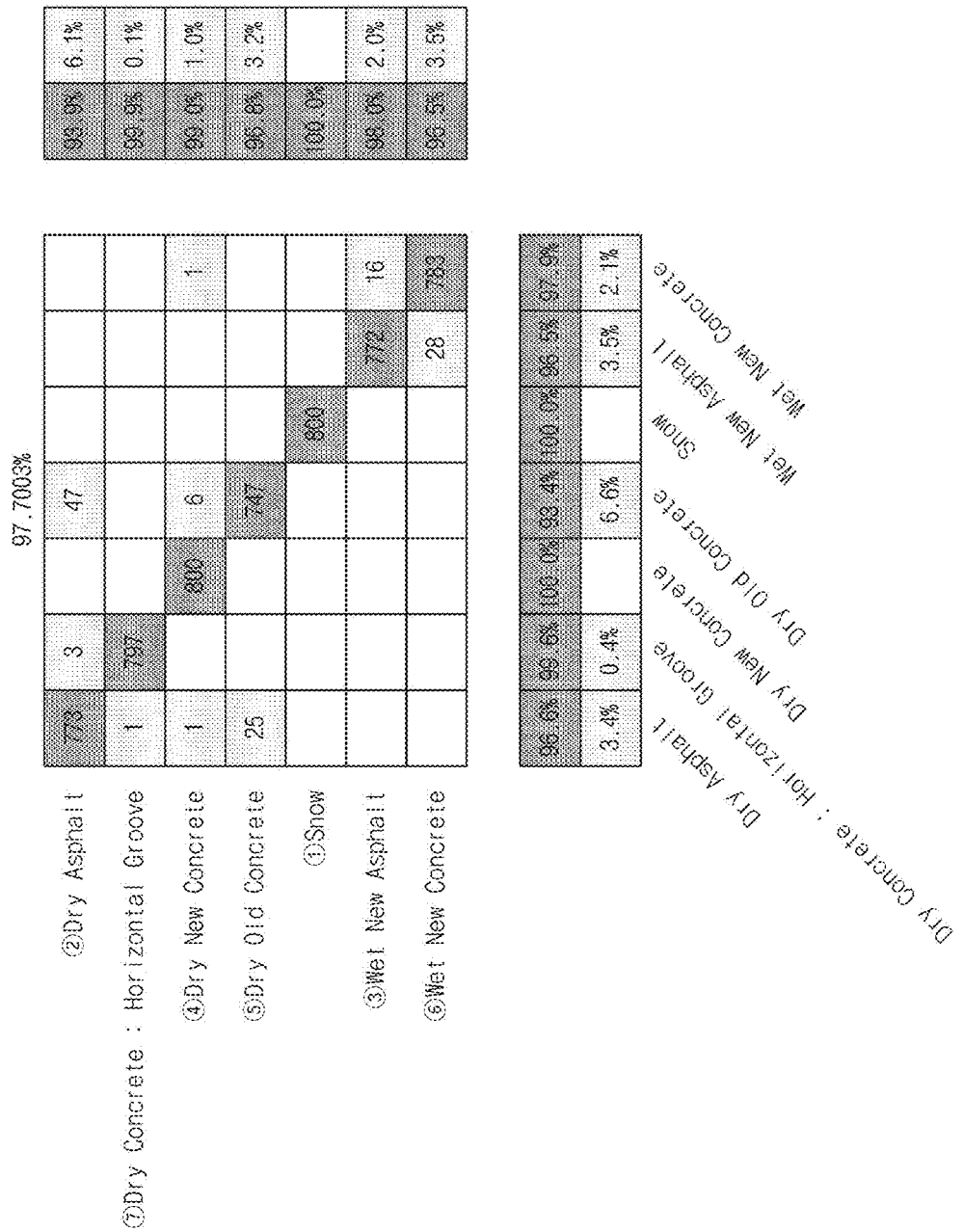
FIG. 8A is a first exemplary view illustrating the performance of a first deep learning model provided in an apparatus for predicting a friction coefficient of a road surface according to an embodiment of the present disclosure.

FIG. 8A is a first exemplary view illustrating the performance of a first deep learning model provided in an apparatus for predicting a friction coefficient of a road surface according to an embodiment of the present disclosure, and illustrates an estimation result in a vehicle equipped with four-season tires.

First, it may be understood that the number of times that the first deep learning model accurately estimated as the dry asphalt ② is 773 times, and the first deep learning model estimated as the dry concrete lateral groove ⑦ in one among the remaining 27 times that are not so estimated. In addition, it may be understood that the first deep learning model once estimated as the dry new concrete ④ and estimated as the dry old concrete ⑤ in 25 times. Therefore, the estimation accuracy for the dry asphalt ② is 96.6% and the error rate is 3.4%.

Next, it may be understood that the number of times that the first deep learning model accurately estimated as the dry concrete lateral groove ⑦ is 797 times, and estimated as dry asphalt ② in the remaining 3 times that are not so estimated. Therefore, the estimation accuracy for the dry concrete transverse groove ⑦ is 99.6% and the error rate is 0.4%.

Next, it may be understood that the number of times that the first deep learning model accurately estimated as the dry new concrete ④ is 800 times, and there is no case where it is not estimated. Therefore, the estimation accuracy for the dry new concrete ④ is 100%.

Next, it may be understood that the number of times that the first deep learning model accurately estimated as the dry old concrete ⑤ is 747 times, and the first deep learning model estimated as the dry asphalt ② as in 47 times among the remaining 53 times that is not so estimated. In addition, it may be understood that the first deep learning model estimated as the dry new concrete ④ 6 times. Therefore, the estimation accuracy for the dry old concrete ⑤ is 93.4% and the error rate is 6.6%.

Next, it may be understood that the number of times that the first deep learning model accurately estimated as the snow ① is 800 times, and there is no case where it is not estimated. Therefore, the estimation accuracy for the snow ① is 100%.

Next, it may be understood that the number of times that the first deep learning model accurately estimated as the wet new asphalt ③ is 772 times, and the first deep learning model estimated as the wet new concrete ⑥ in the remaining 28 times that are not so estimated. Therefore, the estimation accuracy for the wet new asphalt ③ is 96.5% and the error rate is 3.5%.

Next, it may be understood that the number of times that the first deep learning model accurately estimated as the wet new concrete ⑥ is 783 times, and the first deep learning model estimated as the dry new concrete ④ in one among the remaining 17 times that are not so estimated. In addition, it may be understood that the first deep learning model estimated as the wet new asphalt ③ in 16 times. Therefore, the estimation accuracy for the wet new concrete ⑥ is 97.9% and the error rate is 2.1%.

Finally, the total estimation accuracy of the first deep learning model in a vehicle equipped with four-season tires is 97.7003%.

Figure 8B:
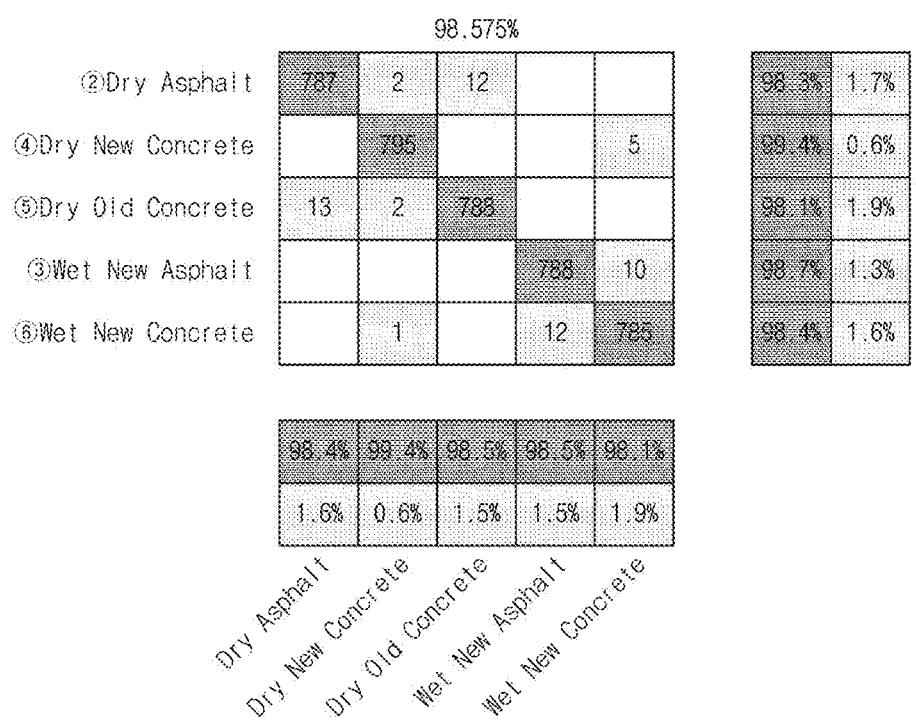
FIG. 8B is a second exemplary view illustrating the performance of a first deep learning model provided in an apparatus for predicting a friction coefficient of a road surface according to an embodiment of the present disclosure.

FIG. 8B is a second exemplary view illustrating the performance of a first deep learning model provided in an apparatus for predicting a friction coefficient of a road surface according to an embodiment of the present disclosure, and illustrates an estimation result in a vehicle equipped with summer tires.

First, it may be understood that the number of times that the first deep learning model accurately estimated as the dry asphalt ② is 787 times, and estimated as the dry old concrete ⑤ in 13 times that are not so estimated. Therefore, the estimation accuracy for the dry asphalt ② is 98.4% and the error rate is 1.6%.

Next, it may be understood that the number of times that the first deep learning model accurately estimated as the dry new concrete ④ is 795 times, and the first deep learning model estimated as the dry asphalt ② in two among the remaining 5 times that are not so estimated. In addition, it may be understood that the first deep learning model estimated as the dry old concrete ⑤ twice and once as the wet new concrete ⑥. Therefore, the estimation accuracy for the dry new concrete ④ is 99.4% and the error rate is 0.6%.

Next, it may be understood that the number of times that the first deep learning model accurately estimated as the dry old concrete ④ is 788 times, and the first deep learning model estimated as the dry asphalt ② in the remaining 12 times that are not so estimated. Therefore, the estimation accuracy for the dry old concrete ⑤ is 98.5% and the error rate is 1.5%.

Next, it may be understood that the number of times that the first deep learning model accurately estimated as the wet new asphalt ③ is 788 times, and the first deep learning model estimated as the wet new concrete ⑥ in the remaining 12 times that are not so estimated. Therefore, the estimation accuracy for the wet new asphalt ③ is 98.5% and the error rate is 1.5%.

Next, it may be understood that the number of times that the first deep learning model accurately estimated as the wet new concrete ⑥ is 785 times, and the first deep learning model estimated as the dry new concrete ④ as in 5 times among the remaining 15 times that is not so estimated. In addition, it may be understood that the first deep learning model estimated as the wet new asphalt ③ 10 times. Therefore, the estimation accuracy for the wet new concrete ⑥ is 98.1% and the error rate is 1.9%.

Finally, the total estimation accuracy of the first deep learning model in a vehicle equipped with summer tires is 98.575%.

Meanwhile, it was also verified whether there are other factors significantly affecting the estimation accuracy of the first deep learning model.

Figure 9A:
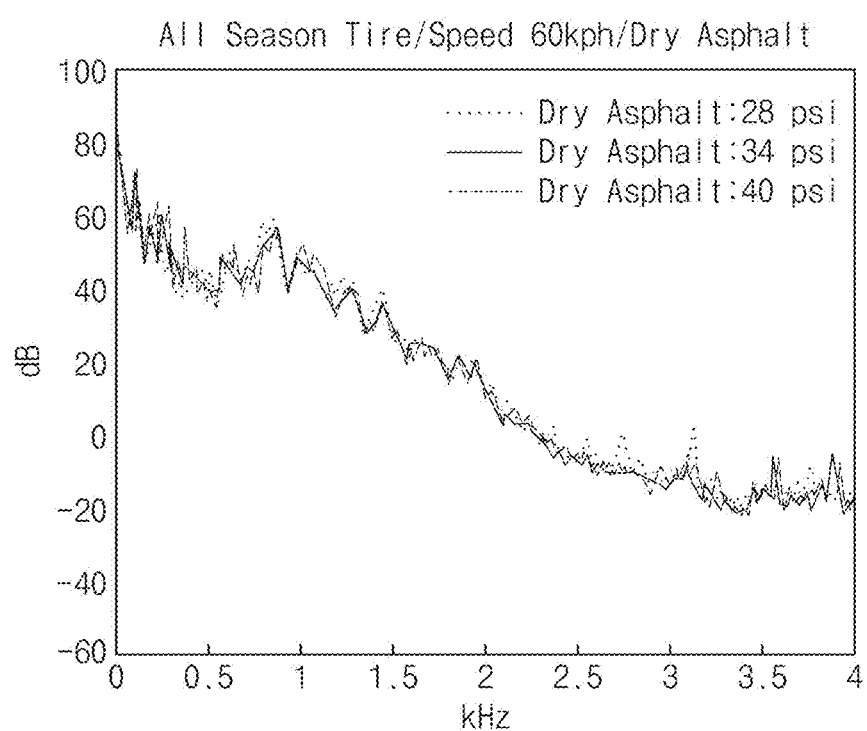
FIG. 9A is a first exemplary view illustrating the effect of tire air pressure on the estimation performance of a first deep learning model provided in an apparatus for predicting a friction coefficient of a road surface according to an embodiment of the present disclosure.

FIG. 9A is a first exemplary view illustrating the effect of tire air pressure on the estimation performance of a first deep learning model provided in an apparatus for predicting a friction coefficient of a road surface according to an embodiment of the present disclosure.

First, in a state where a vehicle equipped with four-season tires drives on the dry asphalt ② at a speed of 60 kph, the intensity of the sound signal for each frequency obtained while controlling the air pressure is as shown in FIG. 9A.

As shown in FIG. 9A, the intensity of the sound signal for each frequency, which is the source data of the first deep learning model, does not change significantly even when the tire air pressure is changed. Thus, the estimation accuracy of the first deep learning model also shows a slight difference for each air pressure, and the tire air pressure does not significantly affect the estimation accuracy of the first deep learning model.

Figure 9B:
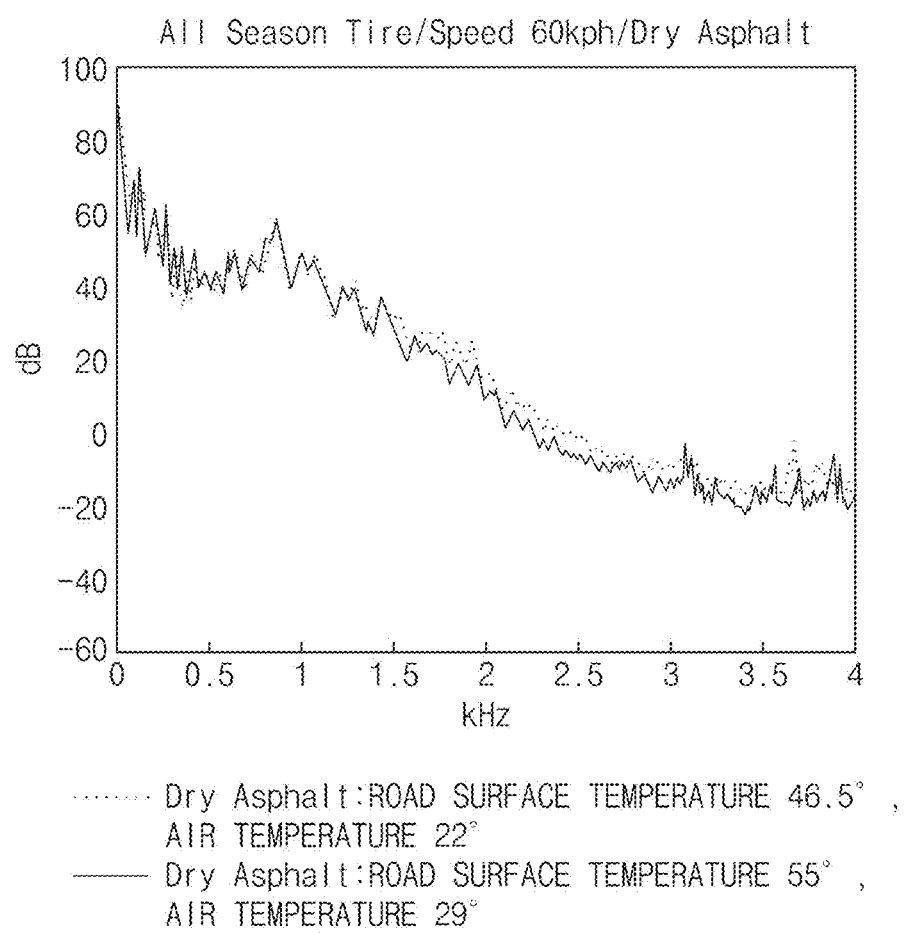
FIG. 9B is a second exemplary view illustrating the effect of temperature on the estimation performance of a first deep learning model provided in an apparatus for predicting a friction coefficient of a road surface according to an embodiment of the present disclosure.

FIG. 9B is a second exemplary view illustrating the effect of temperature on the estimation performance of a first deep learning model provided in an apparatus for predicting a friction coefficient of a road surface according to an embodiment of the present disclosure.

First, in a state in which a vehicle equipped with four-season tires drives on the dry asphalt ② at a speed of 60 kph, when the road surface temperature is 46.5° C. and the atmospheric temperature is 22° C., and when the road surface temperature is 55° C. and the air temperature is 29° C., the intensity of the sound signal for each frequency obtained in each case is as shown in FIG. 9B.

As shown in FIG. 9B, the intensity of the sound signal for each frequency, which is the source data of the first deep learning model, does not change significantly even when the temperature is changed. Thus, the estimation accuracy of the first deep learning model also shows a slight difference for each temperature, and the temperature does not significantly affect the estimation accuracy of the first deep learning model.

Figure 9C:
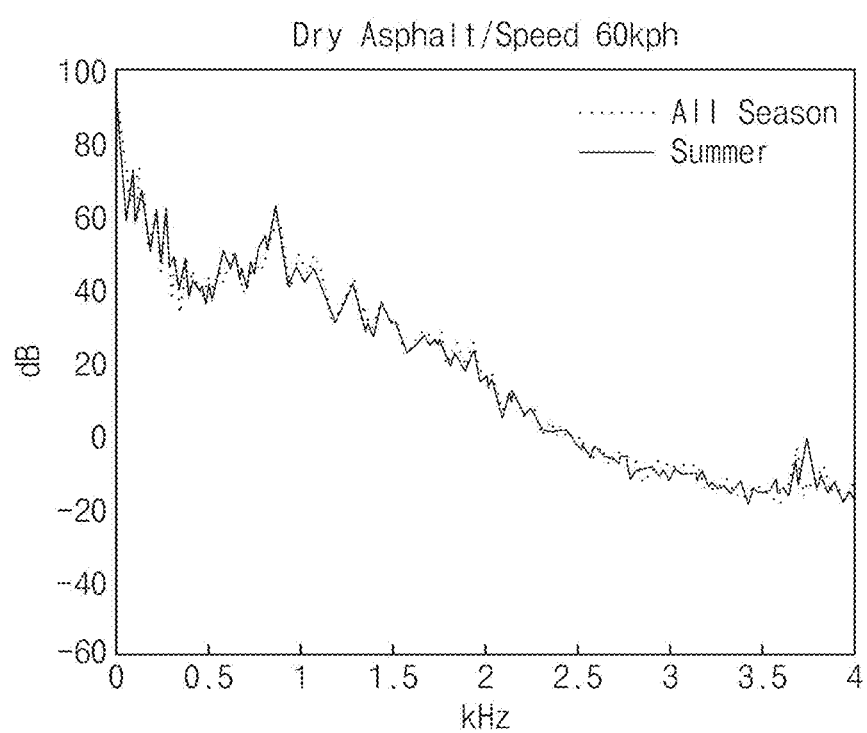
FIG. 9C is a third exemplary view illustrating the effect of temperature on the estimation performance of a first deep learning model provided in an apparatus for predicting a friction coefficient of a road surface according to an embodiment of the present disclosure.

FIG. 9C is a third exemplary view illustrating the effect of temperature on the estimation performance of a first deep learning model provided in an apparatus for predicting a friction coefficient of a road surface according to an embodiment of the present disclosure.

First, the intensity of the sound signal for each frequency obtained while a vehicle equipped with four-season tires drives at a speed of 60 kph and the intensity of the sound signal for each frequency obtained while a vehicle equipped with summer tires drives at a speed of 60 kph are as shown in FIG. 9C.

As shown in FIG. 9C, the intensity of the sound signal for each frequency, which is the source data of the first deep learning model, does not change significantly depending on the type of tire. Thus, the estimation accuracy of the first deep learning model also shows a slight difference for each type of tire and the type of tire does not significantly affect the estimation accuracy of the first deep learning model.

FIGS. 9D to 9G are fourth exemplary views illustrating the effect of temperature on the estimation performance of a first deep learning model provided in an apparatus for predicting a friction coefficient of a road surface according to an embodiment of the present disclosure.

As shown in FIG. 9D, the estimation accuracy of the first deep learning model is 96.70% in a state where the summer tire is worn by 2 mm. As shown in FIG. 9E, the estimation accuracy of the first deep learning model is 95.07% in a state where the summer tire is worn by 4 mm. As shown in FIG. 9F, the estimation accuracy of the first deep learning model is 90.10% in a state where the four-season tire is worn by 2 mm. In addition, as shown in FIG. 9G, the estimation accuracy of the first deep learning model is 89.65% in a state where the four-season tire is worn by 4 mm.

Therefore, it may be understood that there is no significant difference in the estimation accuracy of the first deep learning model according to each degree of tire wear, and thus the degree of tire wear does not significantly affect the estimation accuracy of the first deep learning model.

Figure 10:
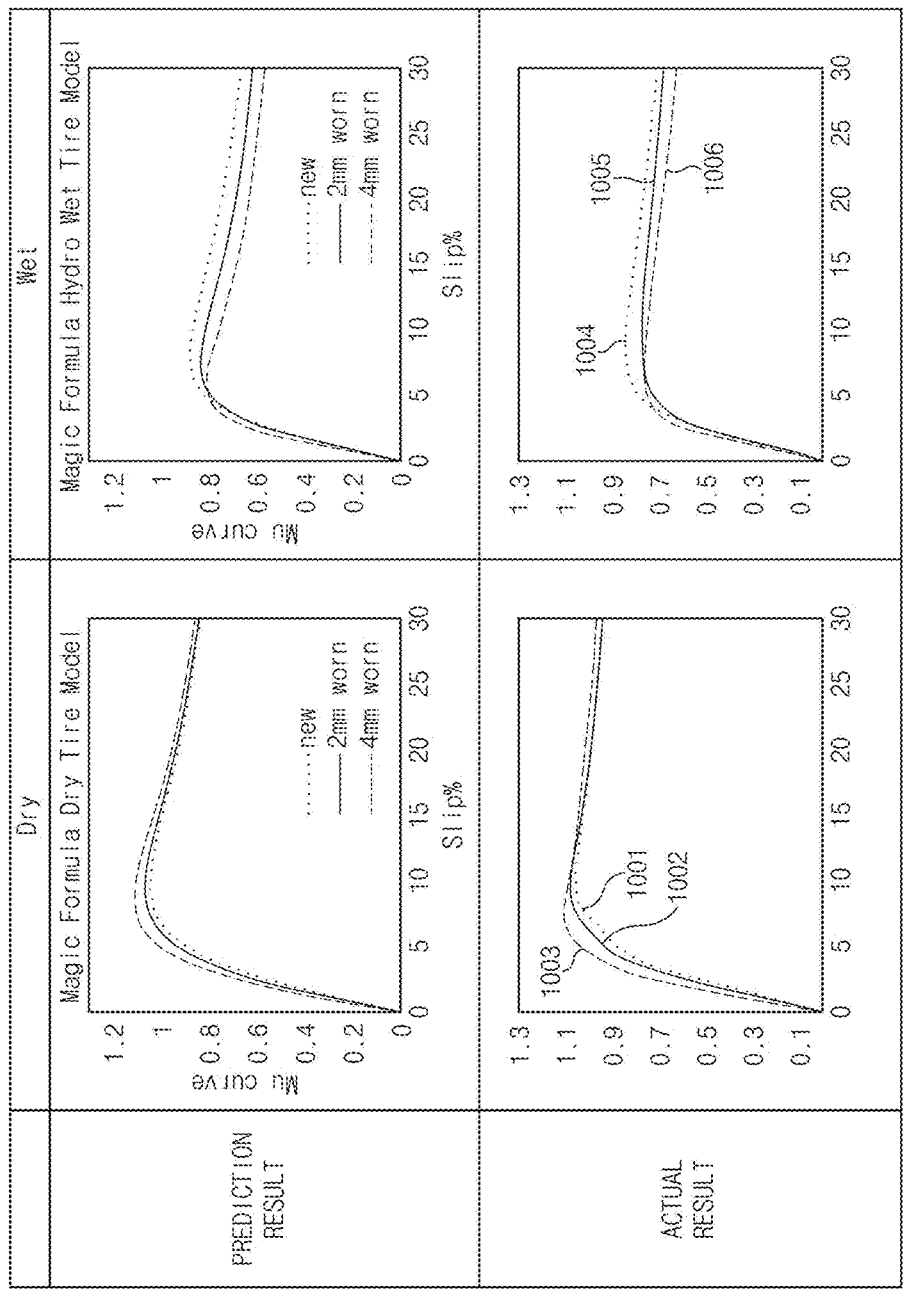
FIG. 10 is an exemplary view illustrating the performance of a second deep learning model provided in an apparatus for predicting a friction coefficient of a road surface according to an embodiment of the present disclosure.

FIG. 10 is an exemplary view illustrating the performance of a second deep learning model provided in an apparatus for predicting a friction coefficient of a road surface according to an embodiment of the present disclosure.

As shown in FIG. 10, it may be understood that the prediction result of a second deep learning model provided in an apparatus for predicting a friction coefficient of a road surface according to an embodiment of the present disclosure is similar to the actual measurement result. That is, the prediction result of the second deep learning model on a dry road surface is similar to the actual measurement result, and the prediction result of the second deep learning model on a wet road surface is similar to the actual measurement result.

For example, for a vehicle equipped with new tires, the predicted friction coefficient curve corresponding to the peak adjustment factor and the initial inclination adjustment factor estimated by the second deep learning model is similar to a friction coefficient curve 1001 actually measured on a dry road surface. For a vehicle equipped with a tire worn by 2 mm, the predicted friction coefficient curve corresponding to the peak adjustment factor and the initial inclination adjustment factor estimated by the second deep learning model is similar to a friction coefficient curve 1002 actually measured on a dry road surface. For a vehicle equipped with a tire worn by 4 mm, the predicted friction coefficient curve corresponding to the peak adjustment factor and the initial inclination adjustment factor estimated by the second deep learning model is similar to a friction coefficient curve 1003 actually measured on a dry road surface.

As another example, for a vehicle equipped with new tires, the predicted friction coefficient curve corresponding to the peak adjustment factor and the initial inclination adjustment factor estimated by the second deep learning model is similar to a friction coefficient curve 1004 actually measured on a wet road surface. For a vehicle equipped with a tire worn by 2 mm, the predicted friction coefficient curve corresponding to the peak adjustment factor and the initial inclination adjustment factor estimated by the second deep learning model is similar to a friction coefficient curve 1005 actually measured on a wet road surface. For a vehicle equipped with worn tires, the predicted friction coefficient curve corresponding to the peak adjustment factor and the initial inclination adjustment factor estimated by the second deep learning model is similar to a friction coefficient curve 1006 actually measured on a wet road surface.

Figure 11:
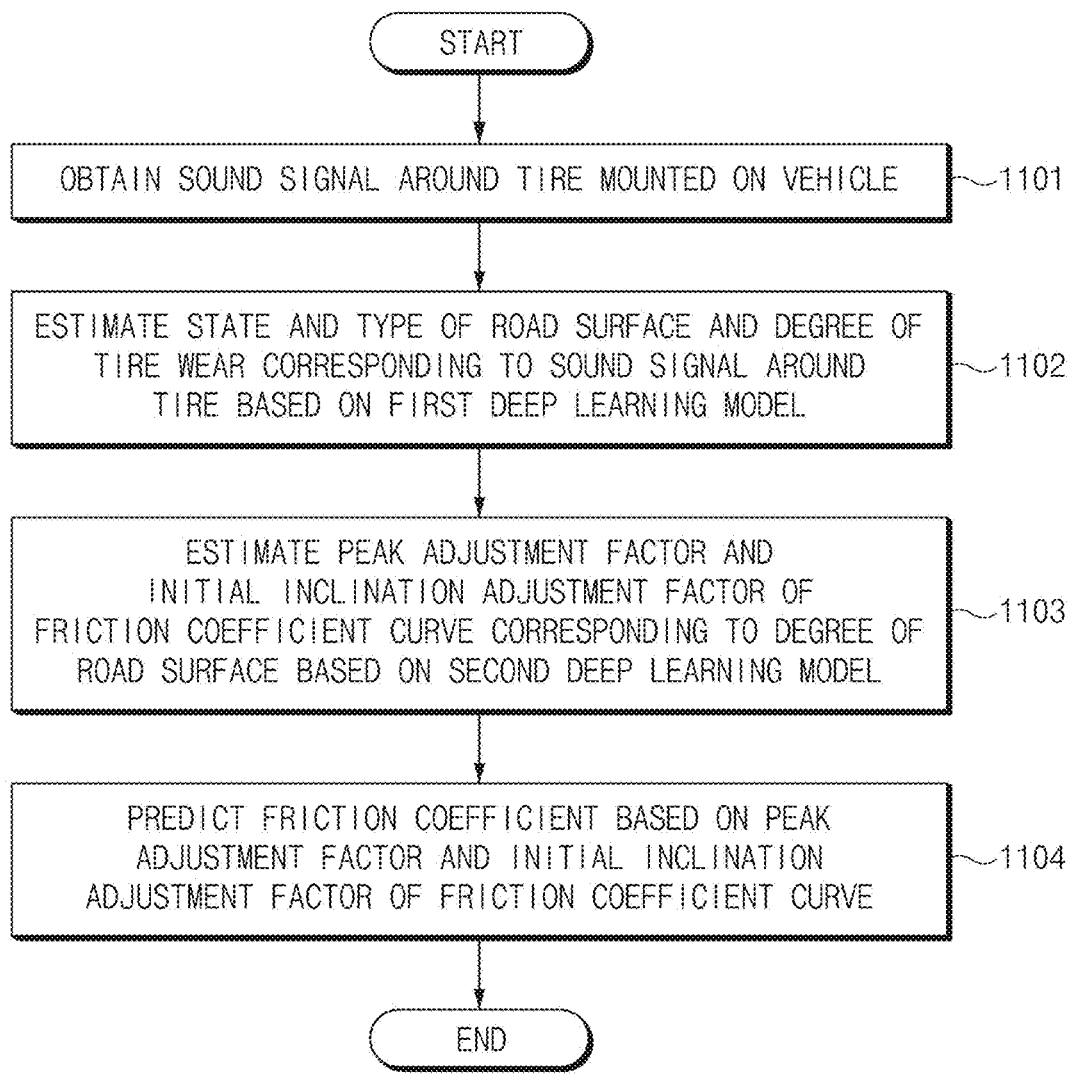
FIG. 11 is a flowchart illustrating a method of predicting a friction coefficient of a road surface according to an embodiment of the present disclosure.

FIG. 11 is a flowchart illustrating a method of predicting a friction coefficient of a road surface according to an embodiment of the present disclosure.

First, in 1101, the microphone 20 obtains a sound signal around the tire mounted on a vehicle.

Thereafter, in 1102, the controller 40 estimates the state and type of a road surface and a degree of tire wear corresponding to the sound signal around the tire based on the first deep learning model.

Thereafter, in 1103, the controller 40 estimates the peak adjustment factor and the initial inclination adjustment factor of the friction coefficient curve and the degree of tire wear corresponding to the state and type of the road surface based on the second deep learning model.

Thereafter, in 1104, the controller 40 predicts the friction coefficient based on the peak adjustment factor and the initial inclination adjustment factor of the friction coefficient curve.

Figure 12:
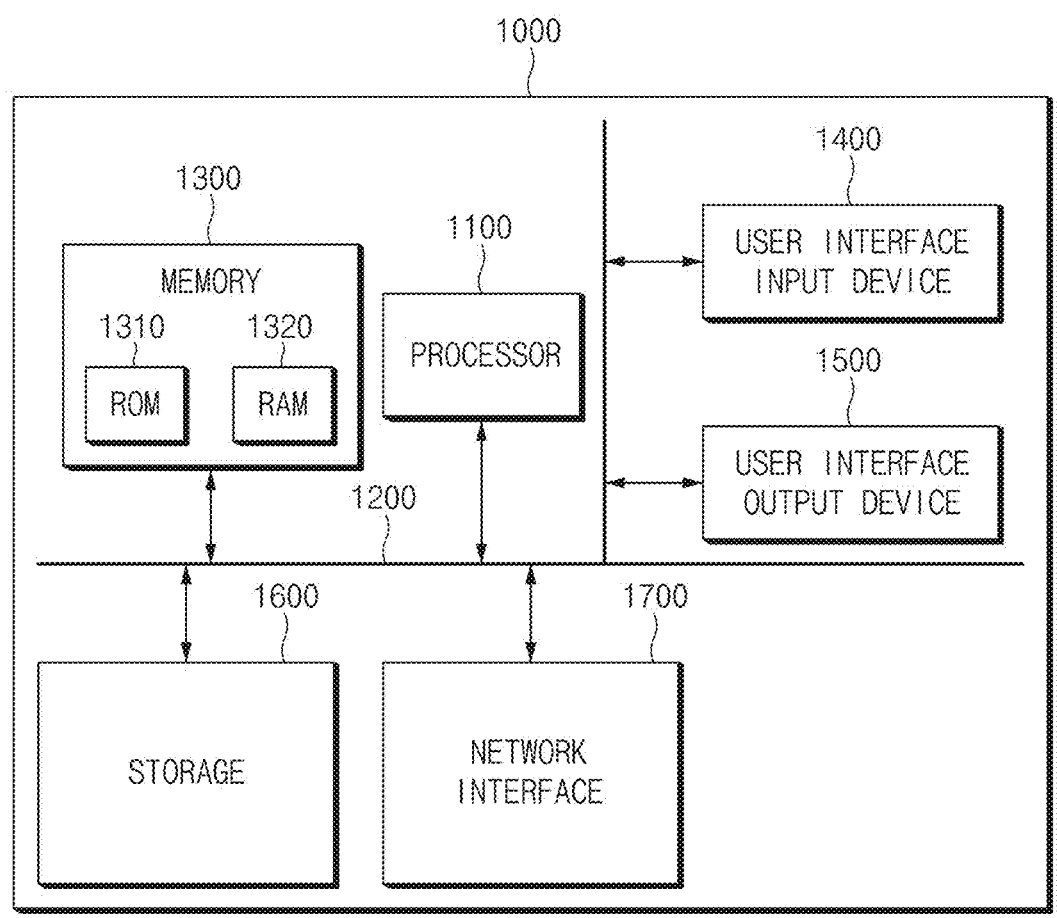
FIG. 12 is a block diagram illustrating a computing system for executing a method of predicting a friction coefficient of a road surface according to an embodiment of the present disclosure.

FIG. 12 is a block diagram illustrating a computing system for executing a method of predicting a friction coefficient of a road surface according to an embodiment of the present disclosure.

Referring to FIG. 12, a method of predicting a friction coefficient of a road surface according to an embodiment of the present disclosure described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method for predicting a friction coefficient of a road surface according to the embodiments of the present disclosure may estimate the state and type of the road surface and the degree of tire wear corresponding to the sound signal around the tire based on the first deep learning model, estimate the peak adjustment factor and the initial inclination adjustment factor of the friction coefficient curve corresponding to the state and the type of the road surface and the degree of tire wear based on the second deep learning model, and predict the friction coefficient based on the peak adjustment factor and the initial inclination adjustment factor of the friction coefficient curve, so that it is possible to improve prediction accuracy.

In addition, the apparatus and method for predicting a friction coefficient of a road surface according to the embodiments of the present disclosure may estimate the state and type of the road surface and the degree of tire wear corresponding to the sound signal around the tire based on the first deep learning model, so that it is possible to monitor abnormal tire wear, tread breakage, and durability performance.

In addition, the apparatus and method for predicting a friction coefficient of a road surface according to the embodiments of the present disclosure may estimate the state and type of the road surface and the degree of tire wear corresponding to the sound signal around the tire based on the first deep learning model, so that it is possible to warn surrounding vehicles of the state (black ice, hydroplaning, snow, and the like) of the road surface and to control the active suspension (shock absorber or variable damper) according to the state of the road surface.

In addition, the apparatus and method for predicting a friction coefficient of a road surface according to the embodiments of the present disclosure may estimate the peak adjustment factor and the initial inclination adjustment factor of the friction coefficient curve corresponding to the state and type of the road surface and the degree of tire wear based on the second deep learning model, and predict the friction coefficient based on the peak adjustment factor and the initial inclination adjustment factor of the friction coefficient curve, so that it is possible to interwork with a smart cruise control (SCC) system, an advanced driver assistance systems (ADAS), and the like.

In addition, the apparatus and method for predicting a friction coefficient of a road surface according to the embodiments of the present disclosure may estimate the state and type of the road surface and the degree of tire wear corresponding to the sound signal around the tire based on the first deep learning model, estimate the peak adjustment factor and the initial inclination adjustment factor of the friction coefficient curve corresponding to the state and type of the road surface and the degree of tire wear based on the second deep learning model, and predict the friction coefficient based on the peak adjustment factor and the initial inclination adjustment factor of the friction coefficient curve, so that it is possible to interwork with an autonomous driving system.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for predicting a friction coefficient of a road surface, the apparatus comprising:
    a microphone to obtain a sound signal around a tire mounted on a vehicle; and
    a controller configured to:
        estimate a state and a type of the road surface and a degree of tire wear corresponding to the sound signal around the tire based on a first deep learning model,
        estimate a peak adjustment factor and an initial inclination adjustment factor of a friction coefficient curve corresponding to the state and the type of the road surface and the degree of tire wear based on a second deep learning model, and
        predict the friction coefficient based on the peak adjustment factor and the initial inclination adjustment factor of the friction coefficient curve.

2. The apparatus of claim 1, wherein the controller is further configured to:
    convert the sound signal around the tire into an image, and
    input the image into the first deep learning model to estimate the state and the type of the road surface and the degree of tire wear.

3. The apparatus of claim 2, wherein the controller is further configured to:
    divide the sound signal around the tire obtained through the microphone by a unit of a preset time,
    convert the divided sound signal into a first image, and
    normalize a region of interest in the first image to a second image of a preset size.

4. The apparatus of claim 3, wherein the controller is configured to convert the divided sound signal to the first image based on a continuous wavelet transform (CWT) algorithm.

5. The apparatus of claim 1, wherein the controller is further configured to generate a surface image of the tire corresponding to the degree of tire wear.

6. The apparatus of claim 5, wherein the controller is configured to estimate the peak adjustment factor and the initial inclination adjustment factor of the friction coefficient curve corresponding to the state and the type of the road surface and the surface image of the tire based on the second deep learning model.

7. The apparatus of claim 1, wherein the controller is further configured to:
    generate the friction coefficient curve based on the peak adjustment factor and the initial inclination adjustment factor of the friction coefficient curve, and
    predict a maximum friction coefficient on the friction coefficient curve.

8. The apparatus of claim 1, wherein the state of the road surface includes at least one of a dry state, a wet state, a snow state, and an ice state.

9. The apparatus of claim 1, wherein the type of the road surface includes at least one of a first asphalt, a second asphalt, a first concrete, a second concrete, a lateral groove, and a longitudinal groove.

10. The apparatus of claim 1, wherein the microphone is mounted in front of a wheel housing arranged on a rear wheel of the vehicle.

11. A method of predicting a friction coefficient of a road surface, the method comprising:
    acquiring, by a microphone, a sound signal around a tire mounted on a vehicle;
    estimating, by a controller, a state and a type of the road surface and a degree of tire wear corresponding to the sound signal around the tire based on a first deep learning model;
    estimating, by the controller, a peak adjustment factor and an initial inclination adjustment factor of a friction coefficient curve corresponding to the state and the type of the road surface and the degree of tire wear based on a second deep learning model; and predicting, by the controller, the friction coefficient based on the peak adjustment factor and the initial inclination adjustment factor of the friction coefficient curve.

12. The method of claim 11, wherein the estimating of the state and the type of the road surface and the degree of the tire wear includes:
converting, by the controller, the sound signal around the tire into an image; and
inputting, by the controller, the image into the first deep learning model to estimate the state and the type of the road surface and the degree of tire wear.

13. The method of claim 12, wherein the converting of the sound signal around the tire to the image includes:
dividing, by the controller, the sound signal around the tire obtained through the microphone by a unit of a preset time;
converting, by the controller, the divided sound signal into a first image; and
normalizing, by the controller, a region of interest in the first image to a second image of a preset size.

14. The method of claim 13, wherein the converting of the divided sound signal into the first image includes:
converting, by the controller, the divided sound signal to the first image based on a continuous wavelet transform (CWT) algorithm.

15. The method of claim 11, wherein the estimating of the peak adjustment factor and the initial inclination adjustment factor includes:
generating, by the controller, a surface image of the tire corresponding to the degree of tire wear.

16. The method of claim 15, wherein the predicting of the friction coefficient includes:
estimating, by the controller, the peak adjustment factor and the initial inclination adjustment factor of the friction coefficient curve corresponding to the state and the type of the road surface and the surface image of the tire based on the second deep learning model.

17. The method of claim 11, wherein the predicting of the friction coefficient includes:
generating, by the controller, the friction coefficient curve based on the peak adjustment factor and the initial inclination adjustment factor of the friction coefficient curve; and
predicting, by the controller, a maximum friction coefficient on the friction coefficient curve.

18. The method of claim 11, wherein the state of the road surface includes at least one of a dry state, a wet state, a snow state, and an ice state.

19. The method of claim 11, wherein the type of the road surface includes at least one of a first asphalt, a second asphalt, a first concrete, a second concrete, a lateral groove, and a longitudinal groove.

20. The method of claim 11, wherein the microphone is mounted in front of a wheel housing arranged on a rear wheel of the vehicle.

* * * * *